(12) United States Patent
Anderson et al.

(10) Patent No.: US 6,184,694 B1
(45) Date of Patent: Feb. 6, 2001

(54) PORTABLE PAINT THICKNESS GAUGE FOR COMPOSITE MATERIALS USING RESONANT CAVITIES AT X-BAND

(75) Inventors: Patrick L. Anderson, Redmond; Christer E. Bjorkegren, Woodinville; Lori E. Kovarik (Forner), Seattle; Bruce S. Howard, Bellevue, all of WA (US)

(73) Assignee: The Boeing Company, Seattle, WA (US)

( * ) Notice: Under 35 U.S.C. 154(b), the term of this patent shall be extended for 0 days.

(21) Appl. No.: 09/135,475

(22) Filed: Aug. 17, 1998

Related U.S. Application Data (63) Continuation-in-part of application No. 08/899,935, filed on Jul. 24, 1997, now abandoned, which is a continuation-in-part of application No. 08/689,978, filed on Aug. 16, 1996, now abandoned.

(51) Int. Cl.[7] .................................................. G01R 27/04
(52) U.S. Cl. ........................... 324/635; 324/636; 324/637
(58) Field of Search ................................... 324/637, 635, 324/644, 642, 636, 601, 639

(56) References Cited

U.S. PATENT DOCUMENTS

| | | | |
|---|---|---|---|
| 3,562,642 | * | 2/1971 | Hochschild ........................... 324/642 |
| 5,057,781 | * | 10/1991 | Arkins et al. ......................... 324/635 |
| 5,384,543 | * | 1/1995 | Bible et al. ........................... 324/637 |
| 5,539,322 | * | 7/1996 | Zoughi et al. ........................ 324/644 |
| 5,748,003 | * | 5/1998 | Zoughi et al. ........................ 324/644 |

OTHER PUBLICATIONS

Loren F. Root and Irving Kaufman, "Noncontacting low–cost instrument for film thickness measurement" Dec. 1992, IEEE Transactions on Instrumentation and Measurement, vol. 41, No. 6, pp. 1014–1019.*

* cited by examiner

*Primary Examiner*—Safet Metjahic
*Assistant Examiner*—Anjan K Deb
(74) *Attorney, Agent, or Firm*—Conrad O. Gardner (57) ABSTRACT

A measuring instrument and method for measuring paint and coating thickness on conductive and poorly conductive substrates. The instrument uses a microwave amplifier, a measurement cavity, and a reference cavity with supporting electronics to measure the apparent changes in the length of the measurement cavity due to the changes in the paint and coating thickness. The measurement cavity resonates when the measurement cavity is set upon the test surface. The oscillating signal is sent through a reference cavity tuned to give the desired filtered response to cover the paint and coating thickness range allowed. The filtered response of the reference cavity is converted to a dc level signal that serves as input to a data acquisition circuit. The data acquisition circuit converts the input signal to digital form so that the calibration method may be used to associate a given response with the corresponding paint and coating thickness.

4 Claims, 8 Drawing Sheets

BOTTOM VIEW OF MICROWAVE
SENSOR SHOWING
MEASUREMENT CAVITY

PORTABLE PAINT THICKNESS GAUGE FOR COMPOSITE MATERIALS USING RESONANT CAVITIES AT X-BAND

RELATED APPLICATION

This is a continuation-in-part of application Ser. No.08/899,935, filed Jul. 24, 1997 now abandoned, which is a continuation-in-part of application Ser. No. 08/689,978, filed Aug. 16, 1996, now abandoned.

BACKGROUND OF THE INVENTION

1. Field of the Invention

The present invention relates to the non-destructive thickness measurements of the paint and coating thickness for metals, graphite/epoxy composites, and other conductive substrates. in particular, the invention may be used to measure the dry paint film thickness of paint film thickness of paint applied by conventional or electrostatic spraying of primer, paint, or other coatings on a conductive or poorly conductive surface.

2. Statement of the Problem

In the spray application of many paints, it is difficult to maintain a uniform thickness application of the primer or paint. The difference in paint film thickness results in appearance changes in which the substrate shows. As a result of the substrate showing through, users tend to apply primer and paint thicker than specified on graphite/epoxy composites. Current methods for measuring dry film thickness on metal substrates do not work on graphite/epoxy composites. There is no good and accurate non-destructive method or device for quickly and accurately measuring the primer, paint and coating thickness on graphite/epoxy composites.

There is a need for a dry film thickness measurement instrument and method for graphite/epoxy composites which does not destroy the paint and coating and accurately measures the dry film thickness on metal and graphite/epoxy composites surfaces.

3. Object of the Invention

One of the objects of the present invention is to provide a measuring instrument which is able to measure thickness of the primer, paint, and coating on metal and graphite/epoxy composites without destroying the dry film layer. To this end, the present invention uses a measurement cavity that oscillates at a fixed frequency dependent on the apparent length of the cavity.

However, it is difficult for users to correlate a given frequency change with a thickness measurement. Therefore, another object of the invention is to provide a measuring instrument which converts the frequency changes due to the apparent length change of the cavity into a thickness measurement.

SUMMARY OF THE INVENTION

An electrical instrument and method for measuring the dry paint and coating thickness on conductive and poorly conductive substrates non-destructively which instrument contains the following components:

a. a measurement cavity that oscillates at frequency dependent on the apparent length of the cavity when the sixth wall is formed by the conductive substrate;

b. a reference cavity connected to the above measurement cavity to convert the frequency changes to dc level changes;

c. a data acquisition circuit whereby the dc level changes are converted to thickness measurements and displayed to the user;

c. a power supply circuit to provide power to the measurement and reference cavities and the data acquisition circuit. The power supply circuit may be de-energized when the enclosure pressure approaches ambient pressure. The power supply circuit is monitored by the data acquisition circuit to notify the operator when the voltage lever drops below threshold.

BRIEF DESCRIPTION OF THE DRAWING(s)

FIG, 5 is a schematic of the power supply.

DESCRIPTION OF THE PREFERRED EMBODIMENT(s)

The principal advantage of the present invention is to provide an instrument that measures the thickness of dry primer, paint, or coating thickness applied on a metal or graphite/epoxy composite substrates without destroying or damaging the primer, paint or coating. The instrument has the advantage of being independent of the optical reflectivity, color, and scattering properties of the coating. The instrument measures the thickness of a dry film applied to metal, graphite/epoxy composite or other conductive substrates to a measurement uncertainty of 48 microns (0.4 mils) or better. The instrument can be used to accurately measure the dry film thickness of different types of paints, such as glossy, flat and metal-flake containing paints.

Figure 1:
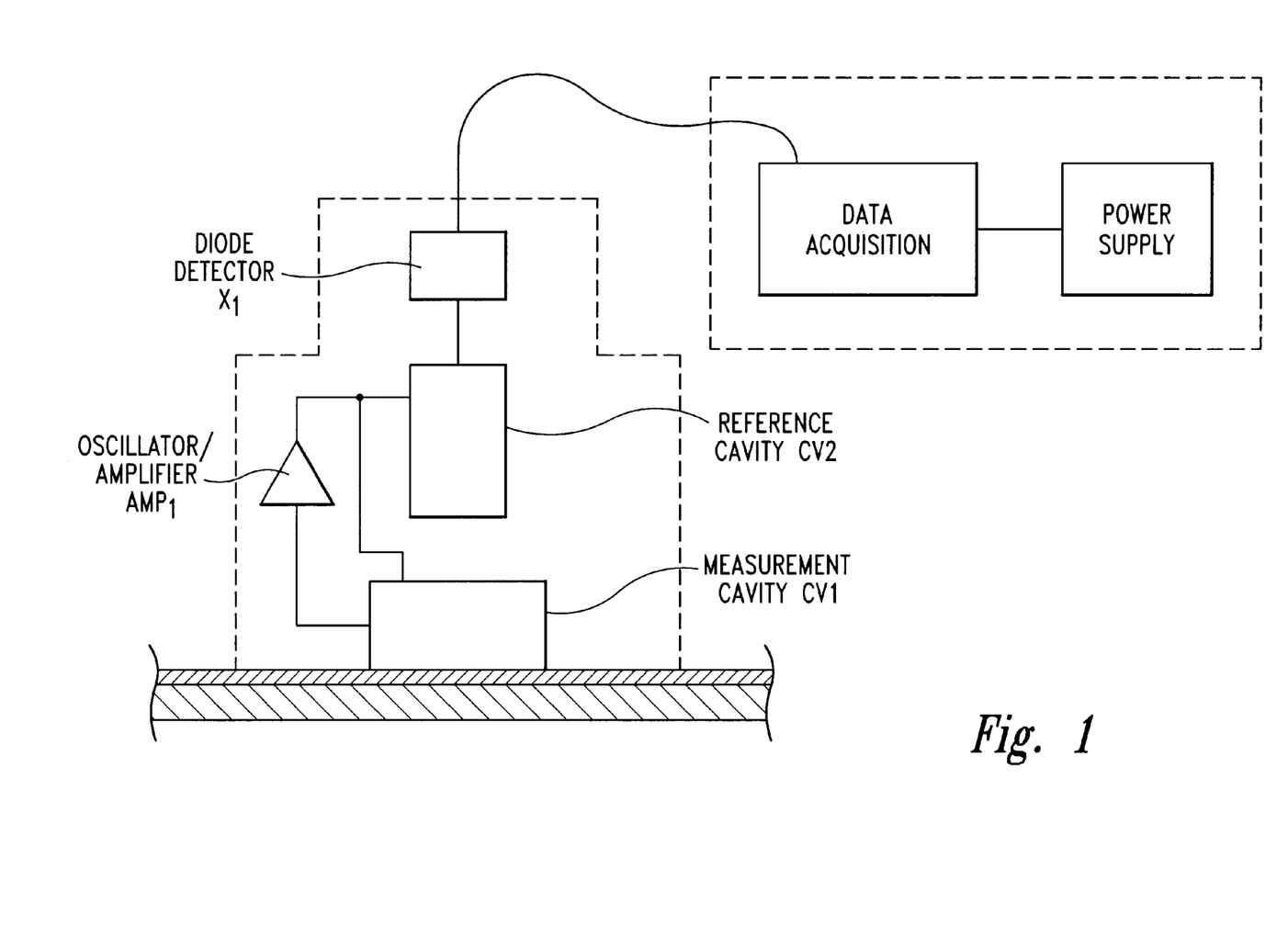
FIG. 1 is a block diagram of the instrument of the invention showing the sensor assembly consisting of the measurement and reference cavities and microwave amplifier, the data acquisition circuit, and power supply.
Figure 2:
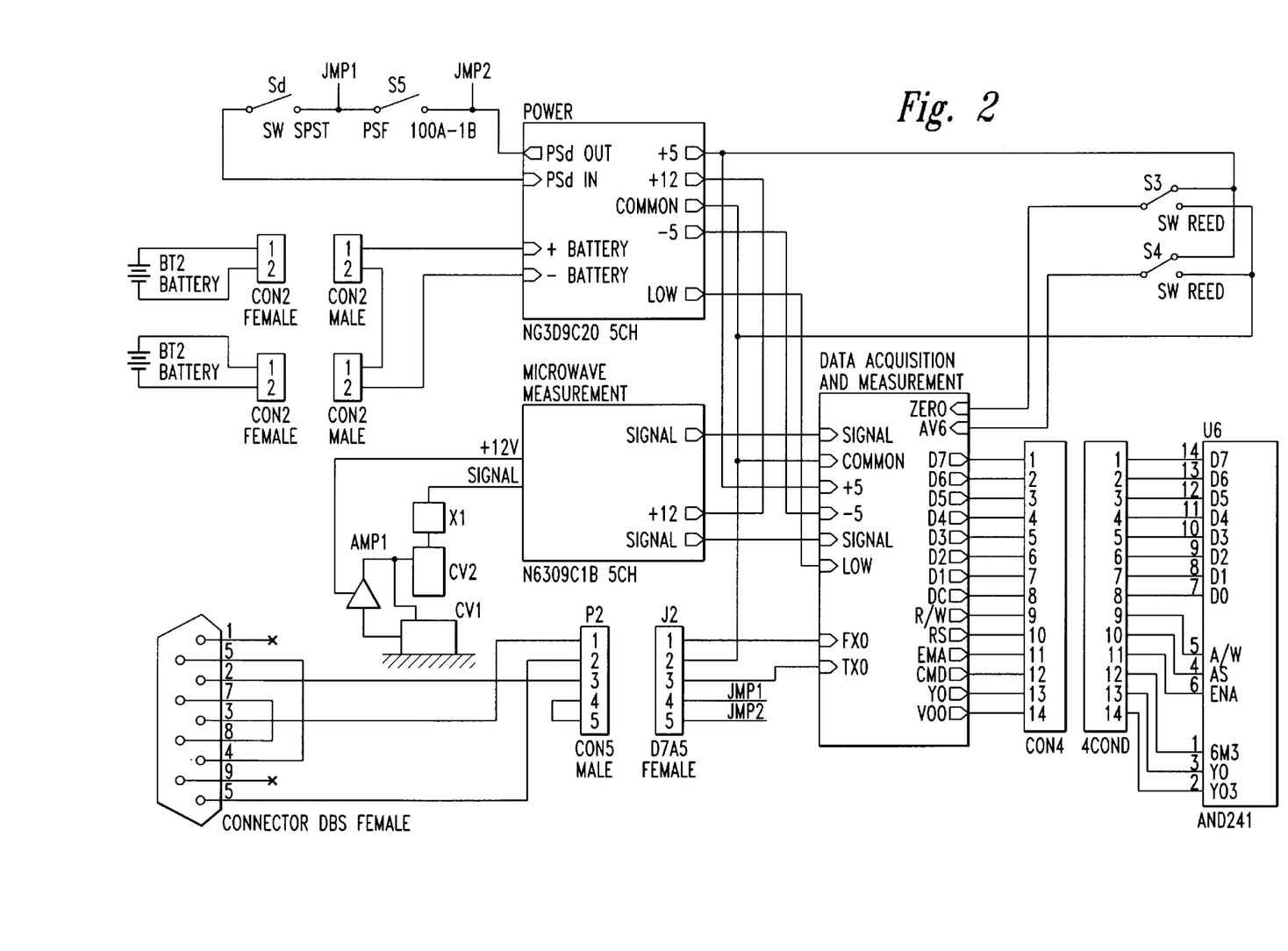
FIG. 2 is a schematic of the electronics showing the electrical connections between the sensor, data acquisition, power supply, and user interface.

As shown in FIG. 1, an instrument embodying the present invention comprises an enclosure housing a measurement cavity CV1, microwave amplifier AMP1, and reference cavity CV2. A small film covers the base of the measurement cavity CV1 to prevent marking of the coated substrate. The amplifier AMP1 and measurement cavity CV1 loop oscillates when the sixth wall of the measurement cavity is formed by the top layer of conductive material of the surface to be measured. The frequency of the oscillation of the amplifier AMP1 and measurement cavity CV1 is given as a function of the cavity length:

$$freq = \frac{V}{2l},$$

where freq is the frequency of oscillation and 1 is the cavity length. V is the velocity of propagation given by the equation:

$$V = C/\sqrt{\epsilon},$$

where c is the speed of electromagnetic wave in free space and $\epsilon$ is the relative permittivity. As the oscillating frequency of the amplifier AMP1 and measurement cavity CV1 are inversely related to the length of the measurement cavity CV1, increasing the thickness of a dry film layer above the top layer of conductive material of the surface to be measured decreases the oscillating frequency of the measurement cavity CV1 and microwave amplifier AMP1. FIG. 2 describes the electrical connections between the sensor, (formed by the measurement cavity CV1, microwave amplifier AMP1, reference cavity CV2, and diode detector X1), data acquisition circuit, power supply circuit, and the user interface. The microwave amplifier AMP1 is electrically connected to the power supply circuit described in FIG. 5. The sensor is electrically connected to the data acquisition circuit described in FIG. 4. The data acquisition circuit is electrically connected to the power supply circuit, the zero switch S3, the average switch S4, the liquid crystal display U6, and can be electrically connected to external computer via a RS232C connector J2. The power supply circuit is connected to the on/off switch S1, to the batteries BT1 and BT2 via the connectors J4 and J5, and to the pressure switch S5. The oscillating frequency of the measurement cavity CV1 and microwave amplifier AMP1 feedback loop is electrically connected to the input of the reference cavity as seen in FIG. 3. The sensor formed by the measurement cavity CV1 and microwave amplifier AMP1 is tuned to provide a roll-off of about 11decibels when the sensor is placed on the bare surface to a surface with about 200 microns (about 9.0 mils) of dry film thickness. Together the measurement cavity CV1, the microwave amplifier AMP1, reference cavity CV2, and diode detector X1 form the sensor. The reference cavity CV2 acts as a bandpass filter which has a resonant frequency slightly greater than the oscillating frequency of the measurement cavity CV1 and microwave amplifier AMP1 when the sensor is placed on a bare material on which the dry film thickness is to be measured. Thus, the output of the reference cavity CV2 is an oscillating signal of varying amplitude and frequency that depends on the frequency of the oscillation of the measurement cavity CV1 and microwave amplifier AMP1. The output frequency of the reference cavity CV2 is the same as the input frequency of the measurement cavity CV1 and microwave amplifier AMP1. However, the amplitude of the oscillating signal out of the reference cavity decreases as the oscillating frequency of the measurement cavity CV1 and microwave amplifier AMP1 decreases as the length of the measurement cavity CV1 increases as the dry film thickness increases. A diode detector X1 is used to rectify the oscillating signal from the reference cavity CV2 to a dc level signal. The diode detector X1 is electrically connected to the data acquisition circuit described in FIG. 4.

Figure 4A:
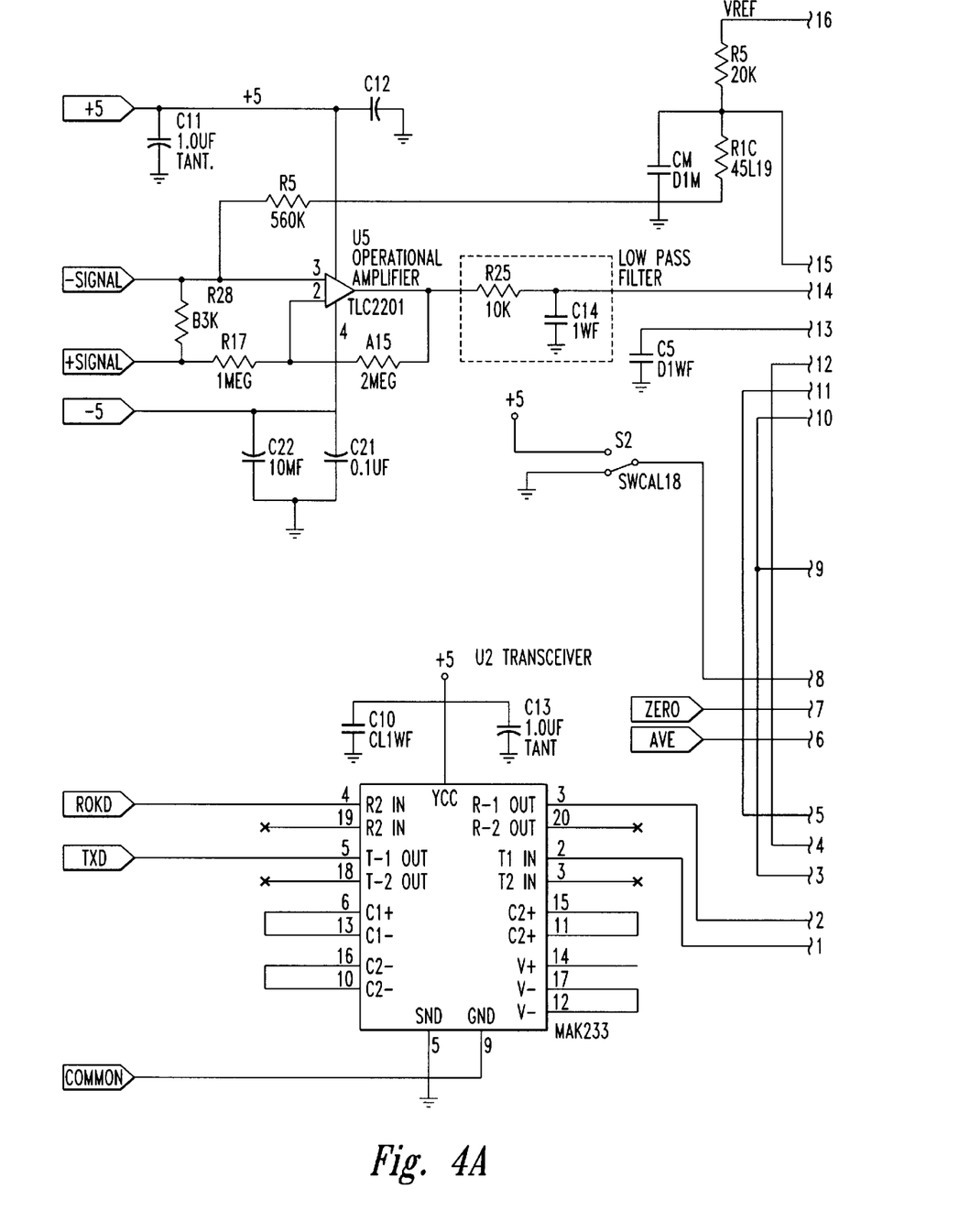
FIGS. 4A and 4B taken together are a schematic of the data acquisition circuit.
Figure 4B:
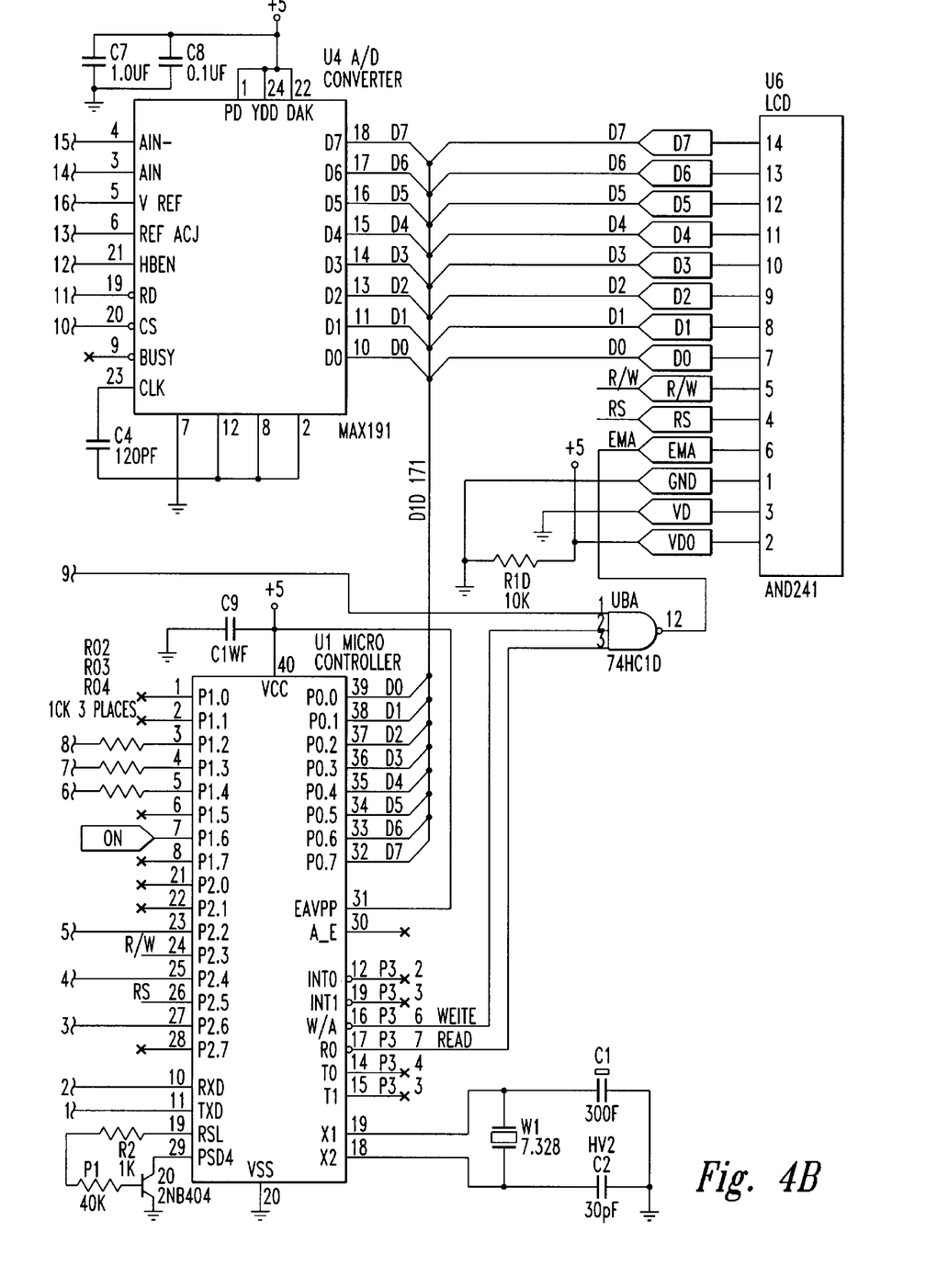

FIGS. 4A and 4B together form a schematic diagram of the data acquisition circuit. The output of the diode detector X1 is electrically connected and is amplified by an operational amplifier L5. The dc level output signal of X1 decreases as the oscillation of the measurement cavity CV1 and microwave amplifier AMP1 decreases in frequency as the length of the measurement cavity CV1 increases by increasing dry film thickness. The operational amplifier L5 converts the signal and amplifies the signal. The signal of the operational amplifier L5 is low-pass filtered by R25 and C14 and digitized by an analog-to-digital converter U4. The microcontroller U1 controls the a/d converter U4, converts the reading from digital counts to thickness readings, and displays the result on the liquid crystal display U6. In addition, the microcontroller U1 supports the storage and downloading of the stored measurements to a host computer through the transceiver U2. The microcontroller U1 is loaded with software to perform a variety of functions. The software functions of the microcontroller U1 are: 1) controlled sampling of the input signal from the operational amplifier L5 to the analog-to-digital converter U4, 2) conversion of the counts to dry film thickness using linear interpolation, 3) display of the thickness measurement to the liquid crystal display U6, 4) storage of the calibration values in memory, 5) input of the calibration values, 6) download of the measurement, 7) calibration routine of the instrument, 8) determination of the proper rotation of the sensor enclosure, and 9) a low battery message displayed to the user. The microcontroller U1 is electrically connected to a calibration mode switch S2, a zero switch S3, and an average switch S4 so that the user can control the flow of the predetermined and stored program.

When the calibration switch is on, the microcontroller U1 first prompts the operator to input or change the known thickness measurements of standards. The operator is then prompted to place the sensor on first an unpainted panel of the substrate and to successively thicker standards up to 16 mils thick. The instrument is now calibrated.

When the calibration switch is not activated, the microcontroller U1 prompts the user to download previous measurements. The interface cable is electrically connected to connector of transceiver U2. the measurements with a date and time stamp are downloaded into the host personal computer. The user is then prompted whether to zero the instrument on a bare, unpainted substrate. According to a predetermined program stored in memory of the microcontroller U1, the microcontroller U1 determines the minimum thickness measurement. If the zero switch is activated, the microcontroller U1 senses when the sensor head is rotated to the proper orientation and stores the reading as a reference reading. The liquid crystal display U6 shows "READY" when the measurement process begins. The microcontroller U1 senses when the reading is the lowest and in the proper orientation. The reference reading is subtracted from the minimum reading to give the thickness reading of the dry film thickness.

Figure 5:
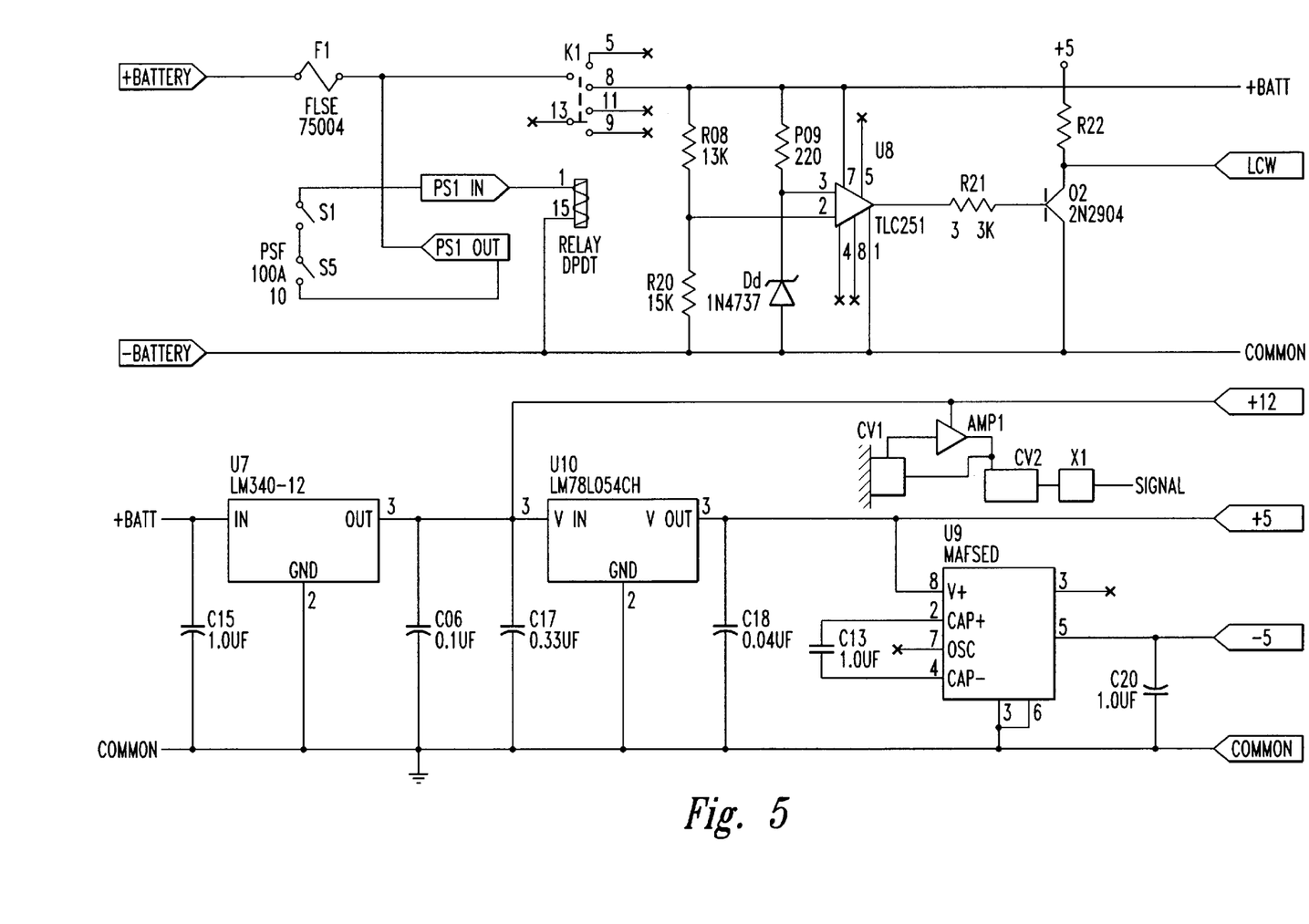

FIG. 5 is a schematic of the power supply circuit. The comparator U8 is electrically connected to the battery output and to the microcontroller U1. When the battery output falls below a threshold level, the comparator U8 goes low and is sensed by the microcontroller U1. The liquid crystal display U6 shows a low battery message to the operator. When the pressure switch S5 is inactivated by the internal pressure of the second enclosure not being greater than ambient, the circuit is de-energized. The battery supply is regulated by voltage regulators to provide regulated 12 Volt, 5 Volt, and −5 Volt power to the sensor and data acquisition circuit.

The invention provides a means for determining the orientation of the top layer of conductive strands, for example, in unidirectional graphite/epoxy tape which may be hidden from view by the coating and also provides a means for determining the depth of the top layer of conductive fibers in an uncoated conductive or poorly conductive surface.

Figure 3A:
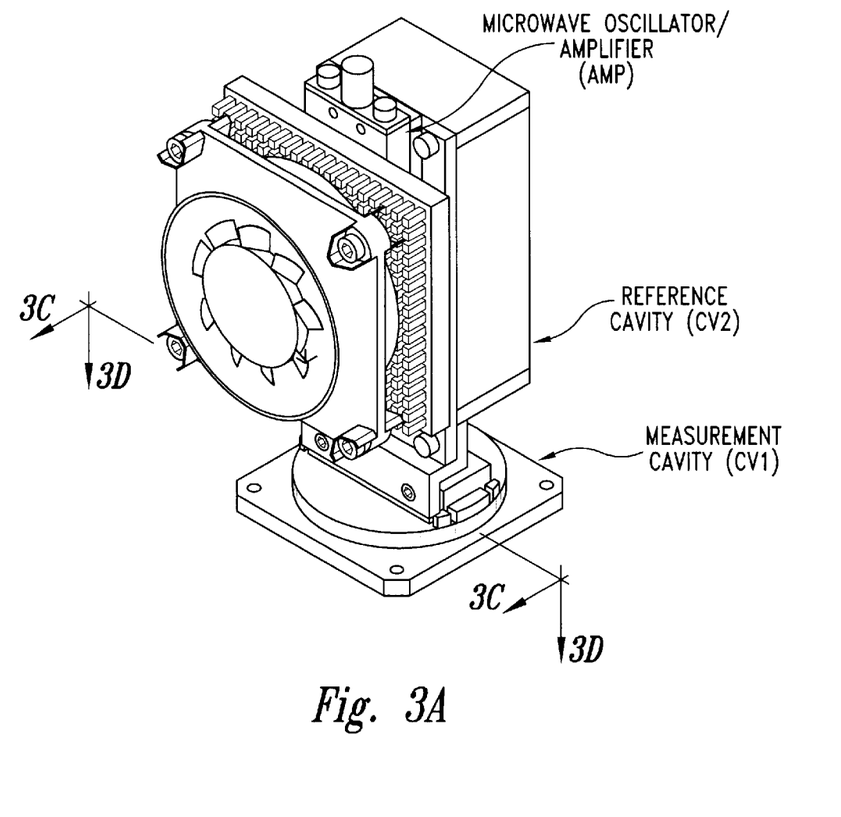
FIG. 3A is a schematic of the sensor. The coaxial connectors and wiring are not shown for clarity.
Figure 3B:
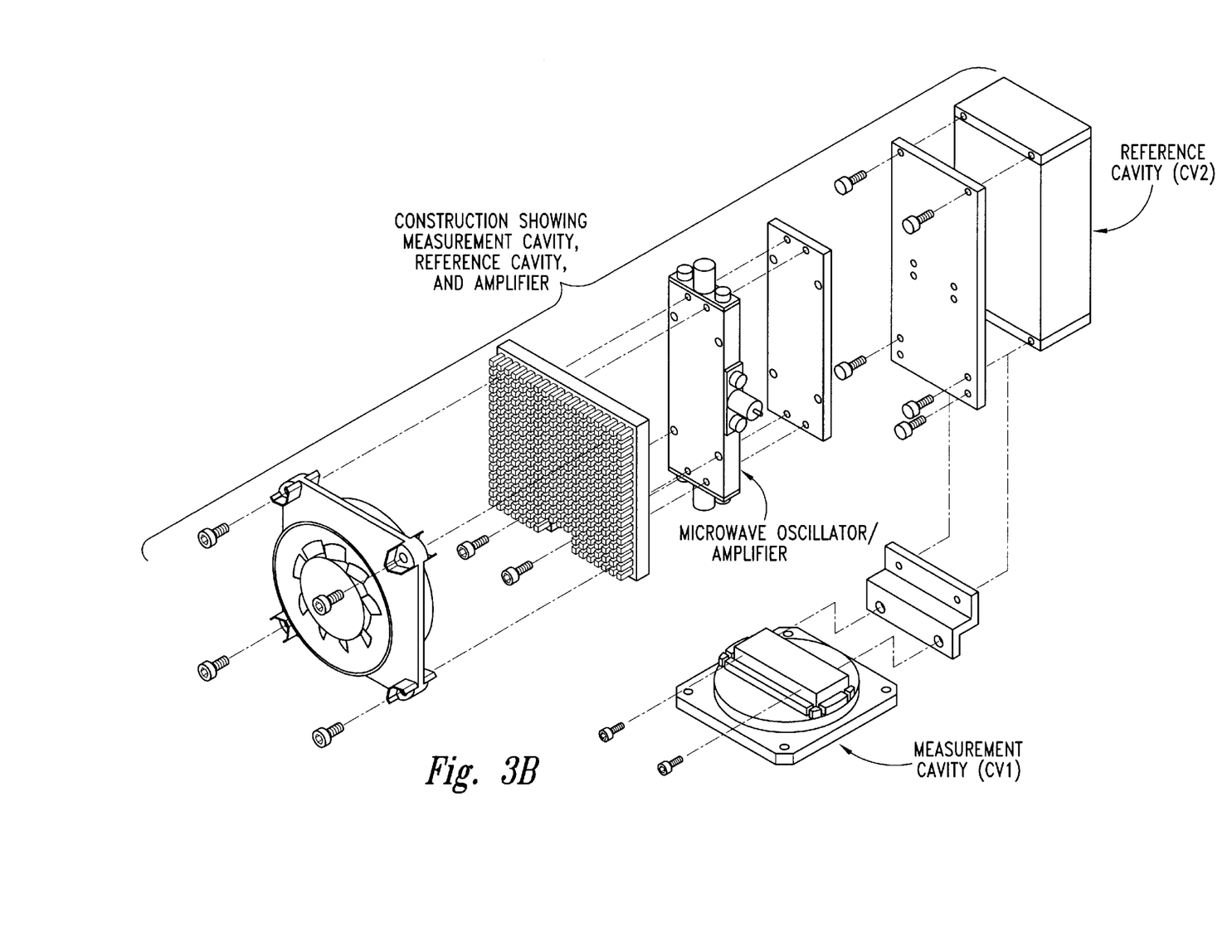
FIG. 3B is a schematic cut-away of the measurement cavity, substrate, and dry film thickness.

The measurement cavity CV1 is formed by five walls shown in FIG. 3A. FIG. 3B shows a cross-section of the measurement cavity CV1 formed by the top wall and two of the four side walls. The substrate material must be conductive to close the measurement cavity CV1.

Figure 3C:
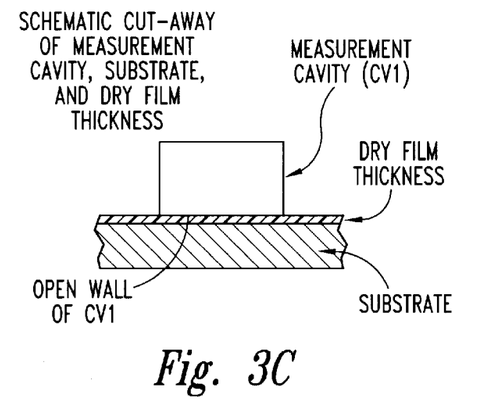
FIG. 3C is a construction view of the sensor formed by the measurement cavity, reference cavity, and microwave amplifier.
Figure 3D:
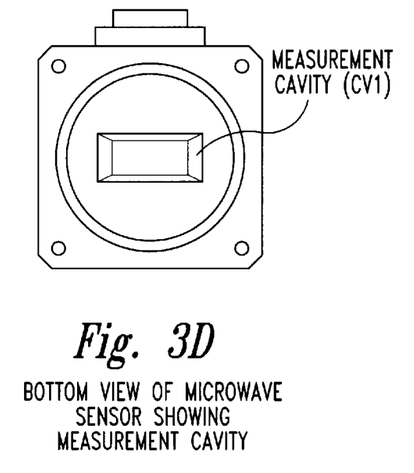
FIG. 3D is a bottom view of the microwave sensor taken along the lines 3D of FIG. 3C showing the measurement cavity CV1.

The measurement cavity (CV1) is a rectangular microwave resonant cavity, one end which is open as shown in FIG. 3C. The amplifier AMP1 and the measurement cavity CV1 form a resonating circuit when the length of the measurement cavity CV1 is closed by the conductive surface of the substrate shown in FIG. 3B. The resonant frequency of the measurement cavity CV1 is given as a function of the measurement cavity length.

Figure 6:
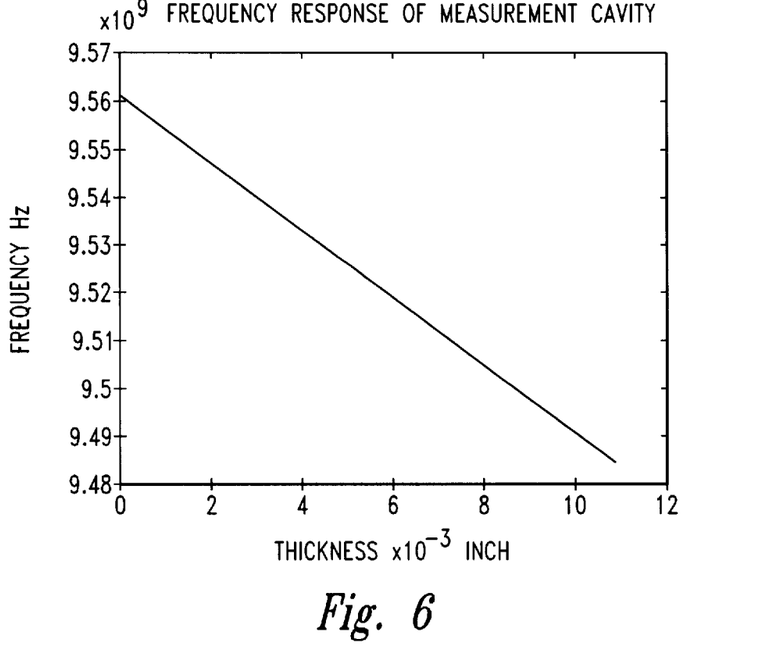
FIG. 6 is a graph showing the relationship between the dry film thickness and the frequency response of the measurement cavity.
Figure 7:
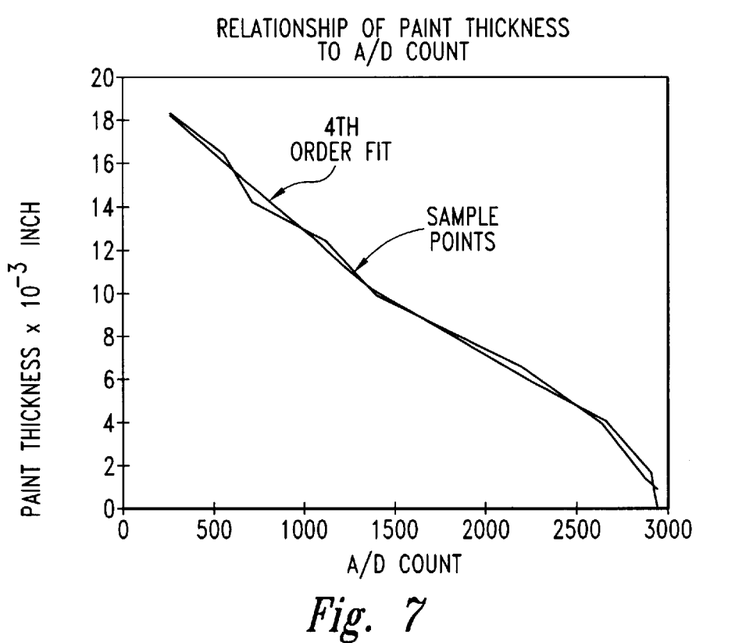
FIG. 7 is a graph showing the relationship between the dry film (paint) thickness and the old count.

FIG. 6 shows the resonant frequency of the measurement cavity CV1 as the dry film thickness in FIG. 3A increases from 0.0 to 0.011 inch on a metal substrate.

The output of the measurement cavity CV1 is taken into the reference cavity CV2. The reference cavity CV2 is formed by a six wall resonating cavity shown in FIG. 3B. The resonating frequency of the reference cavity is set to slightly higher than the resonating frequency of the measurement cavity CV1 on the bare substrate. The amplitude of the output of the reference cavity CV2 decreases as the frequency of the measurement cavity CV1 decreases as the dry film thickness increases.

The diode detector X1 is used to convert the ac level signal out of the reference cavity CV2 to a dc level signal. The dc level signal from the diode detector X1 is converted to a digital representation by the data cavity CV2, microwave amplifier AMP1, and diode detector X1, shown in FIG. 3B. U1, U2, U3, U4 and U5 shown in FIG. 4A and FIG. 4B form the data acquisition block shown in FIGS. 1 and 2. U5 buffers the signal from X1 and inputs the signal to the A/D converter. The A/D converter U4 in FIG. 4B digitizes the dc level signal from the diode detector X1. FIG. 8 shows the sample output of the A/D converter.

The microcontroller U1 controls the A/D converter U4, the RS232C transceiver U2, and liquid crystal display U6 shown in FIG. 2. The microcontroller U1 stores measurements and downloads the stored measurements to a host computer through the RS232C transceiver U2. The A/D counts are converted to thickness measurements through a calibration procedure that utilizes plastic shim stock of known thickness. The microcontroller U1 stores the A/D count associated with the known thickness of the shim stock which are stored in memory of the microcontroller U1. Linear interpolation is used when the A/D count from the A/D converter lies between the known thicknesses. The measurements are displayed to the user on the liquid crystal display U6 and stored in the memory of the microcontroller U1.

The calibration procedure stored in the microcontroller U1 allows a user to define the thickness of a plastic shim used as a measurement standard. The calibration procedure allows the user to store thickness readings of up to eight measurement standards. The user sets the thickness measurement of a measurement standard. When the sensor is placed on measurement standard and the user triggers a measurement, the A/D count is associated with the thickness value for that measurement standard. By associating the A/D counts of measurement standards with known thicknesses, the program stored in the microcontroller U1 uses linear interpolation to determine the thickness of dry film thickness.

The power supply circuit shown in FIG. 5 provides the +12 V dc and common supply to the microwave amplifier AMP1. The +5 V dc -5V dc and common outputs of the power supply circuit in FIG. 5 provide the voltage supply for the data acquisition circuit.

It should be understood that the foregoing description is directed to the preferred embodiment of the disclosed method and instrument and that various changes and modifications, for example, the use of microprocessor or computer or changing the enclosures, may be made without departing from the spirit and scope of the present invention by the appended claims.

What is claimed is:

1. An apparatus for measuring the coating over a conductive and poorly conductive surfaces, said apparatus comprising:

a sensor formed by a measurement cavity electromagnetically coupled to the surface being measured;

a microwave amplifier for emitting an electromagnetic signal;

said combination measurement cavity and said microwave amplifier oscillating at a frequency that varies inversely with the length of the measurement cavity;

a reference cavity for causing the amplitude and phase of the electromagnetic signal to change in amplitude;

a diode detector for converting the oscillating electromagnetic signal to a resultant steady-state level; and means for converting the resultant steady-state level signal to thickness measurements.

2. A measurement cavity according to claim 1, wherein said measurement cavity is a 5-wall microwave cavity electromagnetically coupled to the conductive or poorly conductive surface and wherein the change in the measurement cavity length due to changes in the thickness of the dry film on the surface lowers the frequency of the electromagnetic signal in response to a predetermined program stored in the microcontroller.

3. The apparatus according to claim 1 wherein said reference cavity is electromagnetically coupled to the measurement cavity and microwave amplifier for changing the amplitude of the oscillating frequency of the signal.

4. The apparatus of claim 1 further comprising:

means for converting said resultant steady-state level signal to a digital representation in a microcontroller;

means for storing the characteristic values by determining the apparatus response utilizing standards of known thickness; and means for utilizing said characteristic values in a predetermined program stored in a memory to interpolate the thickness measurement.

* * * * *